(12) United States Patent
Bishop

(10) Patent No.: US 10,105,635 B2
(45) Date of Patent: Oct. 23, 2018

(54) ONE PIECE MEDIA RETENTION SCREEN FOR ADSORPTION CANISTER

(71) Applicant: HAMILTON SUNDSTRAND CORPORATION, Charlotte, NC (US)

(72) Inventor: Benjamin Elmer Bishop, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 135 days.

(21) Appl. No.: 15/295,441

(22) Filed: Oct. 17, 2016

(65) Prior Publication Data

US 2018/0104639 A1 Apr. 19, 2018

(51) Int. Cl.
*B01D 53/04* (2006.01)
*F02M 25/08* (2006.01)
*B01J 19/30* (2006.01)

(52) U.S. Cl.
CPC ........ *B01D 53/0407* (2013.01); *B01J 19/305* (2013.01); *F02M 25/0854* (2013.01); *B01D 2259/4516* (2013.01)

(58) Field of Classification Search
CPC ............ B01D 53/0407; B01D 53/0446; B01D 2259/4516; F02M 25/0854
USPC ........... 96/137, 139, 149, 152; 422/211–223; 210/285, 291, 293; 55/512–519; 123/519
See application file for complete search history.

(56) References Cited

U.S. PATENT DOCUMENTS

| 5,569,316 | A | * | 10/1996 | Flaugher | F25B 43/003 55/519 |
| 5,718,743 | A | * | 2/1998 | Donnelly | B01D 53/261 210/266 |
| 5,776,228 | A | * | 7/1998 | Meiller | B01D 53/0415 123/519 |
| 5,779,773 | A | * | 7/1998 | Cam | B01D 53/0423 55/418 |
| 6,178,772 | B1 | * | 1/2001 | Incorvia | B01D 29/055 62/475 |
| 6,221,122 | B1 | * | 4/2001 | Gieseke | B01D 46/0005 55/385.3 |
| 6,334,889 | B1 | * | 1/2002 | Smolarek | B01D 53/0423 96/137 |

(Continued)

FOREIGN PATENT DOCUMENTS

FR  3022052 A1  11/2015
WO  2016032451 A1  3/2016

OTHER PUBLICATIONS

European Search Report for EP Application No. 17196762.3 dated Mar. 1, 2018.

*Primary Examiner* — Frank M Lawrence, Jr.
(74) *Attorney, Agent, or Firm* — Carlson, Gaskey & Olds, P.C.

(57) ABSTRACT

A retention screen for use in an adsorption canister has outer edges including a seal groove that form a relatively thick portion and a plurality of support pad portions also formed to be relatively thick and relatively thin connecting web portions connecting the outer edge to the support pad portions. The connecting web portions also connect the support pad portions to each other. The retention screen is generally planar. The edge portions and the support pad portions are thicker than the connecting web portions. An adsorption system and a method of manufacture are also disclosed.

20 Claims, 5 Drawing Sheets

(56) References Cited

U.S. PATENT DOCUMENTS

| | | |
|---|---|---|
| 6,616,737 B1 | 9/2003 | Evans et al. |
| 8,119,554 B2 | 2/2012 | Kashani-Shirazi et al. |
| 2003/0056649 A1* | 3/2003 | Lee .................... B01D 53/0423 95/90 |
| 2005/0198993 A1 | 9/2005 | Corrigan |
| 2011/0271833 A1* | 11/2011 | Tentarelli ........... B01D 53/0407 95/104 |
| 2016/0161453 A1 | 6/2016 | de los Reyes |
| 2016/0318687 A1 | 11/2016 | Schneider |

* cited by examiner

ONE PIECE MEDIA RETENTION SCREEN FOR ADSORPTION CANISTER

BACKGROUND OF THE INVENTION

This application relates to a retention screen for use in an adsorption canister housing.

Adsorption systems are known and typically include a canister housing with opposed covers. Within the canister, adsorption media, such as pellets, is deposited. The pellets may also be referred to as beads. Screens are typically placed inwardly of each of the covers to retain the beads in an enclosed area.

A gas to be treated is passed over the beads and certain beneficial functions occur. As an example, in one application, the beads may remove carbon dioxide from air for use in an inhabited vehicle. At some point, the beads must be desorbed. Thus, a vacuum is applied.

The prior art retention screens have typically used standard woven screen materials. The forces applied, in particular, during the vacuum desorbing function, have raised challenges on the screen. It is often the case that beads may be forced through the screen material, which is undesirable.

In addition, the beads must periodically be replaced. During such maintenance, the screen material may be damaged. In addition, seals are typically provided around the edge of the screen to ensure the bulk of the gas flow does pass through the beads. In the prior art, the seals also raise challenges.

SUMMARY OF THE INVENTION

A retention screen for use in an adsorption canister has outer edges including a seal groove that form a relatively thick portion and a plurality of support pad portions also formed to be relatively thick and relatively thin connecting web portions connecting the outer edge to the support pad portions. The connecting web portions also connect the support pad portions to each other. The retention screen is generally planar. The edge portions and the support pad portions are thicker than the connecting web portions.

An adsorption system and a method of manufacture are also disclosed.

These and other features may be best understood from the following drawings and specification.

DETAILED DESCRIPTION

Figure 1:
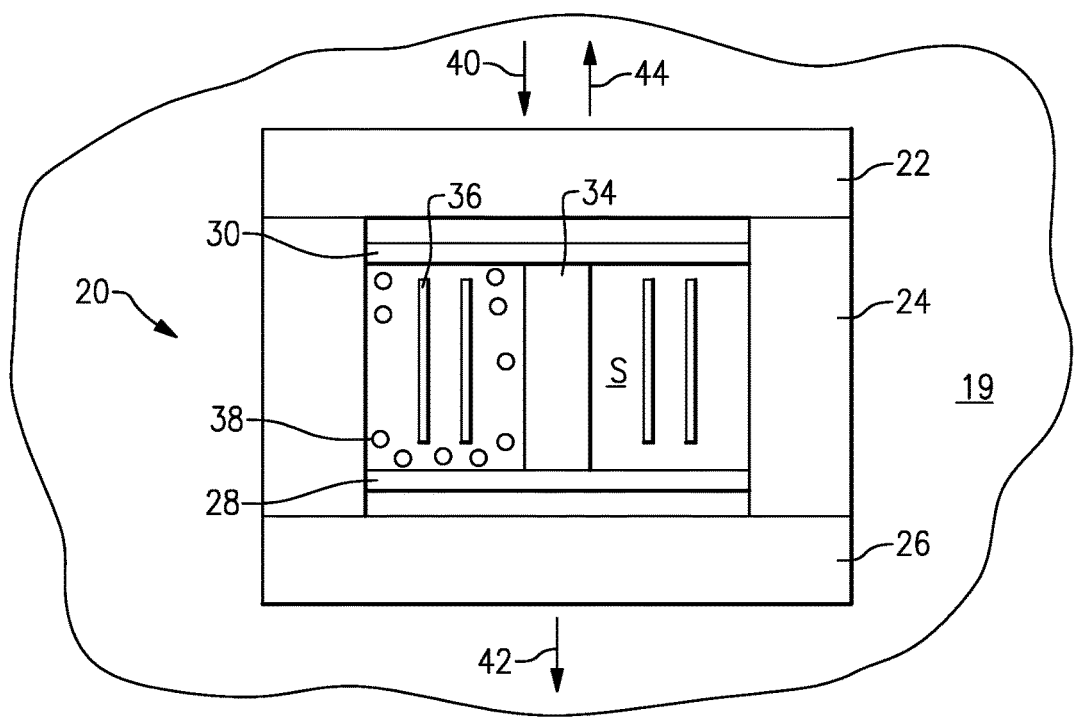
FIG. 1 schematically shows an adsorption system that may be utilized on a manned vehicle.

FIG. 1 schematically shows a manned vehicle 19 that may include an desorption system 20. Such systems may be utilized for processing breathing air and, in particular, for removing carbon dioxide. On the other hand, there are many other functions for which such systems are utilized and which may benefit from this disclosure.

A top cover 22 is spaced by a canister housing 24 from a bottom cover 26. Retention screens 28 and 30 define an enclosed media spaces between them. A support brace 34 extends between the screens. The support brace provides a force resisting flexing of the screens 28 and 30 as gas passes across the space or a vacuum is drawn. A number of support plates 36 are also included. The support plates help keep the covers at top and bottom from collapsing inward when the vacuum is drawn. The plates provide compression load support.

A media 38 which may be beads of adsorption material is placed within the space. Gas 40 may pass across the spaces and exit at 42 having been processed. A desorb function may also be applied such as shown schematically with a vacuum 44 drawn on the spaces.

Figure 2:
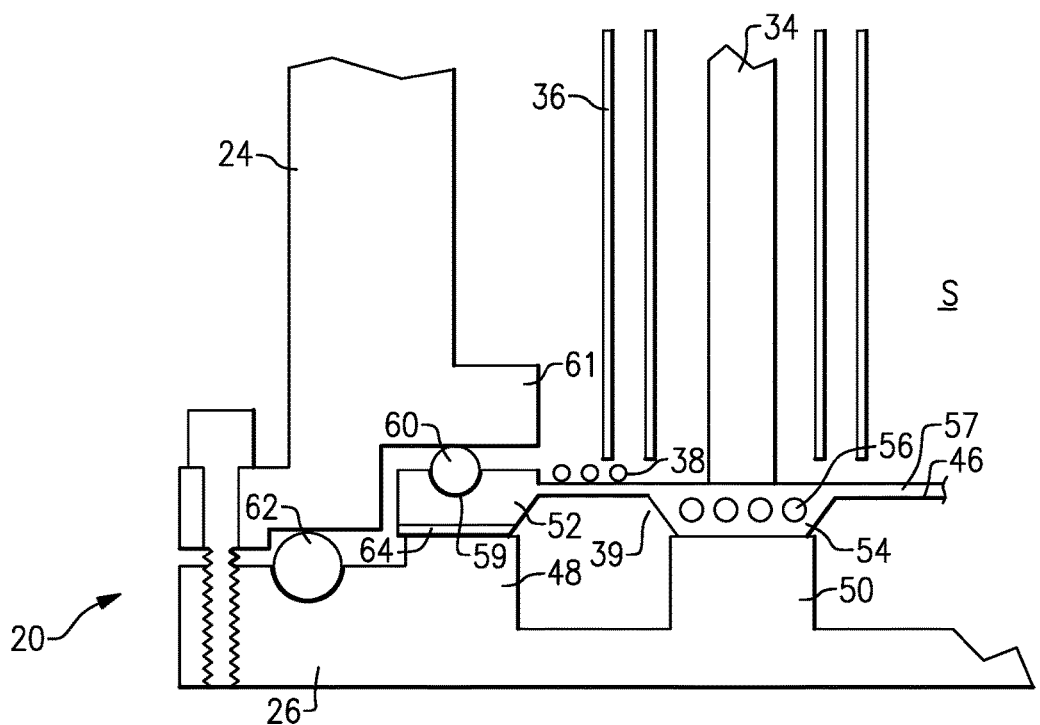
FIG. 2 shows a detail.

As mentioned above, the screens must withstand a number of forces and stresses. Thus, as shown in FIG. 2, a disclosed screen 57 has several improved structural features. The screen 57 may be manufactured as a one piece item, such as by additive manufacturing techniques.

The bottom cover 26 is shown, however, the top cover 22 and its screen 30 may be a mirror image.

The retention screen 57 includes an outer edge portion 52 which is generally thick and sits against a pedestal 48 on the bottom cover 26. A pedestal 50 supports a support pad area 54 of the retention screen 57. Gas flow holes 56 are formed within webbing of the support pad portion 54. Since support portions 54 contact the pedestal 50, it is necessary for gas to pass outwardly into chambers, such as the chamber 39, such that the gas may exit as shown at 42. An O-ring groove 59 is formed in the edge portion 52 and receives an O-ring 60 which sits against a surface 61 of the canister housing 24. An outer O-ring 62 is placed between canister housing 24 and the bottom cover 26. Due to this outer seal, vent slots 64 can be formed through the edge 52 to allow pressure equalization. As shown, the beads 38 sit against the retention screen 57. Of course, the bulk of space S is actually filled with beads. Support brace 34 is now shown to be transmitting force through the support pads 54 and into the pedestal 50. The support pads 54 resist flexing of the screen 57 and thus improve its function. As shown, normal webbing portions 46, which are thinner than the support pad portion 54, connect the support pad 54 to other support pads, other normal webbing portions, and the edge portion 52.

Figure 3:
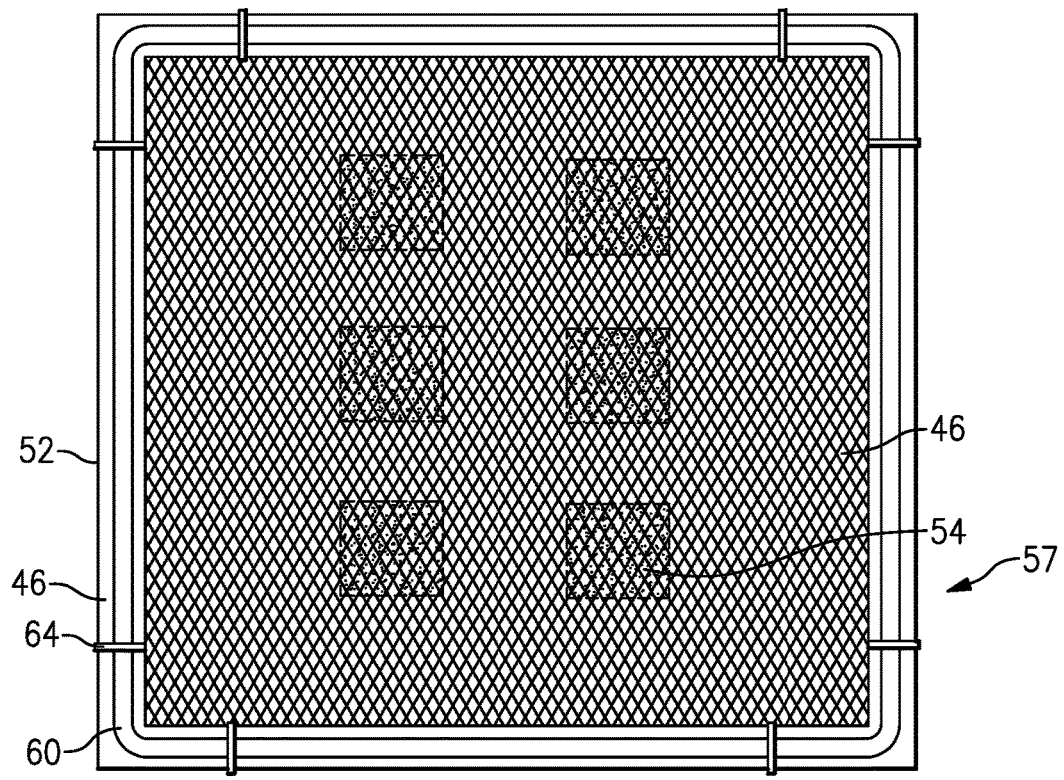
FIG. 3 shows a top view of a retention screen.

FIG. 3 shows that there are several of the support pad areas 54. It should be understood that while the area shown by 54 would appear to be solid, in fact that would be pedestals 50. Portions 54 are formed of a plurality of extending webs separated by space to facilitate gas flow. It is also clear, there are a plurality of the vent slots 64 extending through the edge portion 52.

Figure 4:
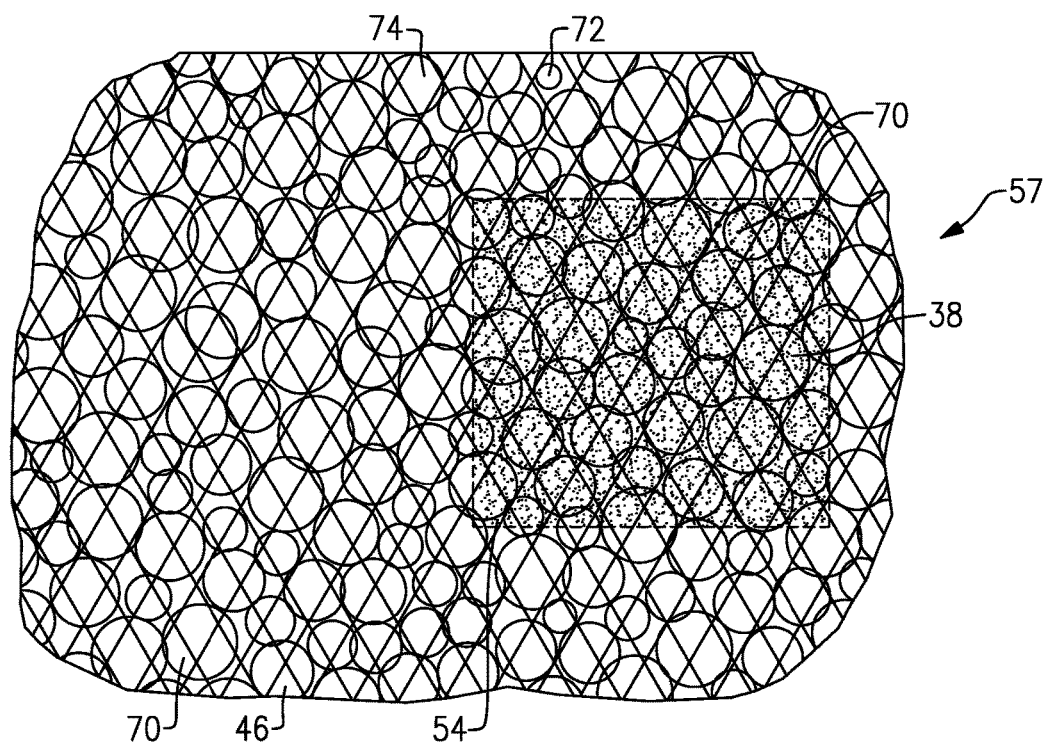
FIG. 4 shows details of the screen.

FIG. 4 is a detail of the retention screen 57 along with a plurality of beads 38. As shown, there are a number of spaces 70 between the web portions. These spaces are also found within the support pad areas 54 as is clear from FIG. 4. As shown, a minimum bead size 72 may still be retained by the webbing. The typical bead size 74 will also be retained.

In embodiments, the screen 57 will be formed by additive manufacturing techniques. This allows the geometry and size of the spaces 70 to be easily formed and to be designed for individual applications.

FIG. 2 shows other detail of the screen. The edge portion 52 is shown formed with groove 59. Normal, or thinner, connecting web portions 46 extend between the edge 52 and the support pads 54. Gas flow holes 56 are shown formed in the support pad portion 54. Another normal web portion 46 extends beyond the support pad portion 54.

Figure 5A:
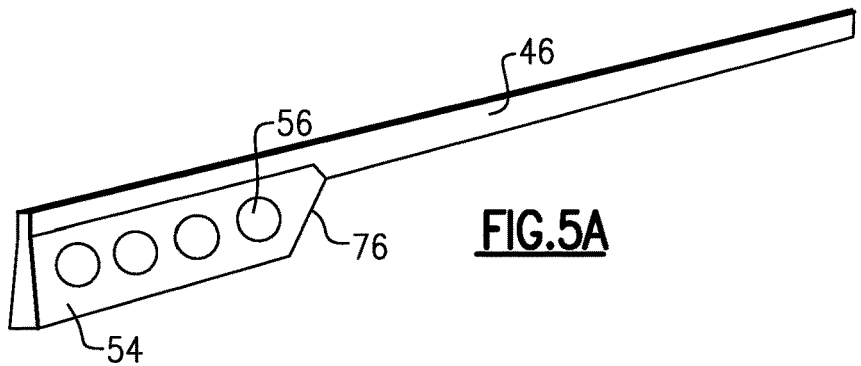
FIG. 5A shows a portion of the screen.
Figure 5B:
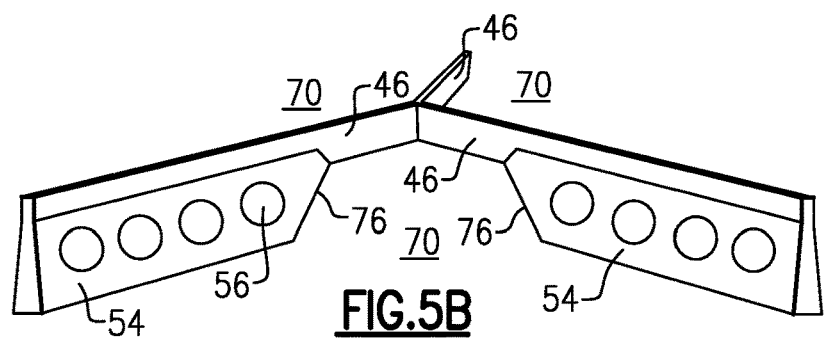
FIG. 5B shows yet another portion.

FIG. 5B shows normal web portions 46 meeting at a junction to form a plurality of spaces 70.

Figure 6A:
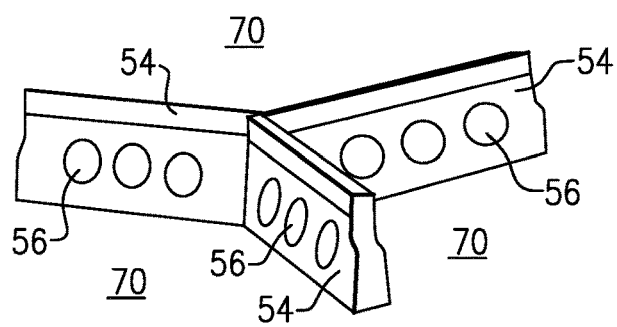
FIG. 6A shows yet another portion.

FIG. 5A shows a transition 76 from a support pad portion 54 to a normal web portion 46. FIG. 5B shows an area between two support pad portions 54. FIG. 6A shows a detail of a support pad. As mentioned above, the support pads are formed of a plurality of interconnected webs 54 and there are spaces 70 intermediate these webs. For this reason, the gas flow holes 56 are formed, such that gas can pass through the holes 56, which would otherwise be blocked by the contact between support pad portion 54 and the pedestal 50.

Figure 6B:
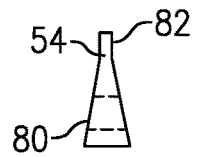
FIG. 6B shows a detail of a support pad portion.

As shown in FIG. 6B, the support pad portions 54 have a thicker portion 80 in cross-section which contacts the pedestal 50 and thinner portions 82 which extend outward to maximize gas flow cross-sectional area.

In one embodiment, the support pad portion at its end 82 extends over less than 20 percent of the over cross-sectional area of the retention screen 57. In embodiments, it may extend over less than 15 percent. In one disclosed embodiment, it extends over approximately 10 percent.

Figure 7:
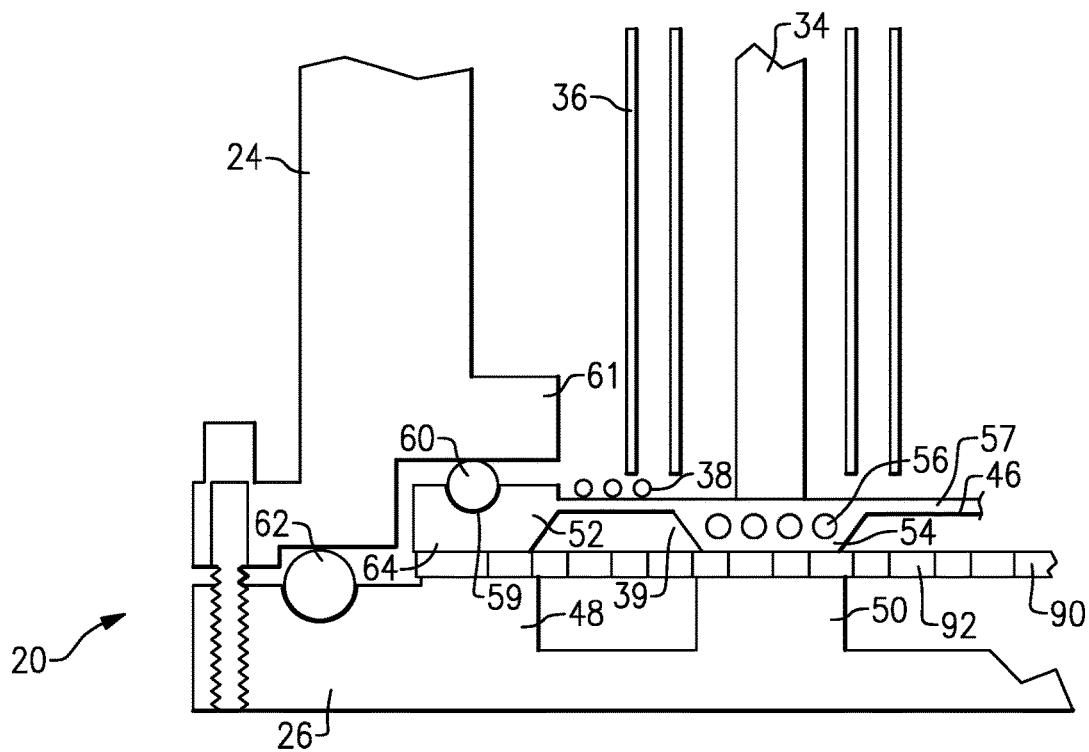
FIG. 7 shows an alternative embodiment.

FIG. 7 shows an alternative embodiment where a backing grid 90 is included between the retention screen 57 and the pedestal 50. The backing grid 90 has a plurality of openings 92 to facilitate gas flow.

The triangular web structure as disclosed above provides maximum retention of the beads, and also tolerance for variable bead diameter. Further, the triangular shape provides higher strength under tension loads to reduce the chance of displacement of the structure. The triangular shape is stronger for a given total mass of webbing and more resistant than other shapes. This provides better resistance to stretching or displacement of the webbing when beads are pressed into the mesh. Further, the ribbon-like shape of the webbing (a height/width ratio is greater than 1.0) provides higher strength for retention while reducing the total pressure drop across the webbing during both process flow and adsorb phase. Further, it reduces out gas flow restrictions during the vacuum desorb phase, and thus overall increases system performance.

Figure 8:
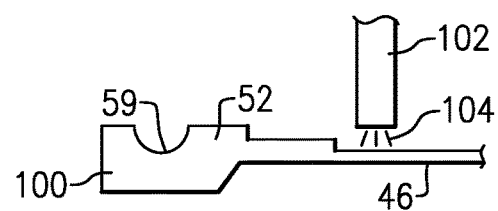
FIG. 8 schematically shows a manufacturing function.

FIG. 8 schematically shows a manufacturing technique which is particularly useful for forming the disclosed embodiments. If the embodiment of FIG. 8 is utilized, the backing grid 90 could be formed integrally with the retention screen 57. The retention screen 57 could alternatively be formed on the backing grid 90 or the two could be separate components.

As shown, an intermediate retention screen 100 has its outer edge 52 formed with the O-ring groove 59. A portion of the normal web 46 has been formed. An additive manufacturing tool 102 is shown depositing material at 104. As known, material is typically deposited in layers with these techniques.

In embodiments, the additive manufacturing technique may be depositing metal such as stainless steel, aluminum, titanium or others. Plastics or other materials suitable for additive manufacturing may also be used.

This application could be summarized as disclosing a retention screen for use in an adsorption canister having outer edges forming a the relatively thick portion and a plurality of support web portions also formed to be relatively thick, and relatively thin connecting web portions connecting said outer edge to said support pad portions. The connecting web portions also connect the support pad portions to each other. The retention screen is generally planar. The thickness of the edge portion and the support pad portions are thicker than the connecting web portions. The thickness of the edge portion and the thickness of the support pad portions may be generally equal, as illustrated. An adsorption system is also disclosed.

A method of forming a retention screen for an adsorption system is disclosed including the steps of depositing material to form a retention screen having a shape with an outer edge and web portions defining spaces to support an adsorption media.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A retention screen for use in an adsorption canister comprising:
   an outer edge including a seal groove and formed to be relatively thick and a plurality of support pad portions also formed to be relatively thick, and relatively thin connecting web portions connecting said outer edge to said support pad portions, and the connecting web portions also connecting said support pad portions to each other, with said retention screen being generally planar and with a thickness of said outer edge and said support pad portions being thicker than a thickness of said connecting web portions.

2. The retention screen as set forth in claim 1, wherein the thickness of said outer edge and the thickness of said support pad portions being generally equal.

3. The retention screen as set forth in claim 1, wherein said support pad portions and said connecting web portions define a plurality of spaces to support an adsorption media.

4. The retention screen as set forth in claim 3, wherein said spaces being sized and designed to capture a minimum bead size of the adsorption media to be retained by said retention screen.

5. The retention screen as set forth in claim 3, wherein said spaces are generally triangular.

6. The retention screen as set forth in claim 1, wherein said support pad portions are formed with a plurality of gas flow holes.

7. The retention screen as set forth in claim 6, wherein said support pad portion is formed by a plurality of interconnected web portions.

8. The retention screen as set forth in claim 1, wherein said outer edge portion is formed with vent slots.

9. The retention screen as set forth in claim 1, wherein said support pad portion is formed by a plurality of interconnected web portions.

10. An adsorption system comprising:
    a canister including a canister housing and opposed covers;
    an adsorption material space defined between said covers, and retention screens placed between said space, and each of said covers, and an adsorption media received in said space, and between said retention screens;
    and at least one of said retention screens having an outer edge formed integrally with web portions, said outer edge having a seal groove, and receiving a seal; and
    wherein said outer edge formed to be relatively thick and a plurality of support pad portions also formed to be relatively thick and relatively thin connecting web portions connecting said outer edge to said support pad portions, and the connecting web portions also connecting said support pad portions to each other, with said retention screen being generally planar and with a thickness of said outer edge and said support pad portions being thicker than a thickness of said connecting web portions.

11. The adsorption system as set forth in claim 10, wherein the thickness of said outer edge portions and the thickness of said support pad portions being generally equal.

12. The adsorption system as set forth in claim 10, wherein a distance between said connecting web portions defining support spaces, and said support spaces being sized and designed to capture a minimum bead size of the adsorption media to be retained by said retention screen.

13. The adsorption system as set forth in claim 10, wherein said support pad portions are formed with a plurality of gas flow holes.

14. The adsorption system as set forth in claim 13, wherein said support pad portion is formed by a plurality of interconnected web portions.

15. The adsorption system as set forth in claim 10, wherein said outer edge portion is formed with vent slots.

16. The adsorption system as set forth in claim 10, wherein said support pad portion is formed by a plurality of interconnected web portions.

17. The adsorption system as set forth in claim 10, wherein support pad portions are in contact with a pedestal on said covers.

18. The adsorption system as set forth in claim 17, wherein there are holes in said support web portion to facilitate flow of gas outwardly of said pedestals.

19. An adsorption system, comprising:
a canister including a canister housing and opposed covers;
an adsorption material space defined between said covers, and retention screens placed between said space, and each of said covers, and an adsorption media received in said space, and between said retention screens; and
at least one of said retention screens having an outer edge formed integrally with web portions, said outer edge having a seal groove, and receiving a seal, and said outer edge having a thickness defined in a direction toward the other of said retention screens from said at least one of said retention screens, and a thickness of said outer edge being thicker than a thickness of said web portions, and said seal groove formed in a face of said outer edge facing the other of said retention screens.

20. The adsorption system as set forth in claim 19, wherein said outer edge formed to be relatively thick and a plurality of support pad portions also formed to be relatively thick and relatively thin connecting web portions connecting said outer edge to said support pad portions, and the connecting web portions also connecting said support pad portions to each other, with said retention screen being generally planar and with a thickness of said outer edge and said support pad portions being thicker than a thickness of said connecting web portions.

* * * * *